(12) United States Patent
Mostoller et al.

(10) Patent No.: US 11,482,817 B2
(45) Date of Patent: Oct. 25, 2022

(54) TWIST-LOCK CONNECTOR SYSTEM HAVING A LIGHT SENSOR ASSEMBLY

(71) Applicant: TE Connectivity Services GmbH, Schaffhausen (CH)

(72) Inventors: Matthew Edward Mostoller, Hummelstown, PA (US); Edward John Howard, Millersburg, PA (US)

(73) Assignee: TE CONNECTIVITY SOLUTIONS GmbH, Schaffhausen (CH)

(*) Notice: Subject to any disclaimer, the term of this patent is extended or adjusted under 35 U.S.C. 154(b) by 0 days.

(21) Appl. No.: 17/140,353

(22) Filed: Jan. 4, 2021

(65) Prior Publication Data
US 2021/0359475 A1 Nov. 18, 2021

Related U.S. Application Data

(60) Provisional application No. 63/024,058, filed on May 13, 2020.

(51) Int. Cl.
| | |
|---|---|
| *H01R 13/66* | (2006.01) |
| *H01R 13/422* | (2006.01) |
| *H05B 47/11* | (2020.01) |
| *F21V 23/00* | (2015.01) |
| *F21S 8/08* | (2006.01) |

(Continued)

(52) U.S. Cl.
CPC .......... *H01R 13/6683* (2013.01); *F21S 8/086* (2013.01); *F21V 23/008* (2013.01); *F21V 23/0464* (2013.01); *F21V 23/06* (2013.01); *H01R 13/422* (2013.01); *H05B 47/11* (2020.01); *F21W 2131/103* (2013.01)

(58) Field of Classification Search
CPC ............ H01R 13/6683; H01R 33/9456; H01R 13/213; H01R 13/71; H01R 24/005; H01R 33/74; H01R 13/422; F21S 8/086; F21V 23/008; F21V 23/0464; F21V 23/06; H05B 47/11; F21W 2131/103; Y02B 20/40
See application file for complete search history.

(56) References Cited

U.S. PATENT DOCUMENTS 9,750,110 B1* 8/2017 Batai ..................... F21V 23/045
10,164,374 B1 12/2018 Reed
(Continued)

FOREIGN PATENT DOCUMENTS

WO 2019 136482 A1 7/2019

OTHER PUBLICATIONS

International Search Report, International Application No. PCT/IB2021/053947, International Filing Date, May 10, 2021.

*Primary Examiner* — Peggy A Neils

(57) ABSTRACT

A twist-lock connector system includes a first twist-lock connector including a first connector housing holding first twist-lock contacts at a first rotate-to-mate interface. The first twist-lock connector includes a first high speed electrical connector. The first high speed electrical connector is movable relative to the first connector housing between a home position and a rotated position. The first twist-lock connector includes a biasing member coupled to the first high speed electrical connector to bias the first high speed electrical connector to the home position. The twist-lock connector system includes a second twist-lock connector having a second connector housing holding second twist-lock contacts and a second high speed electrical connector at a mating interface.

20 Claims, 10 Drawing Sheets

(51) Int. Cl.
   *F21V 23/06*   (2006.01)
   *F21V 23/04*   (2006.01)
   *F21W 131/103* (2006.01)

(56) References Cited

U.S. PATENT DOCUMENTS

| | | | |
|---|---|---|---|
| 11,215,333 B2* | 1/2022 | Wang | F21V 23/006 |
| 2003/0224643 A1* | 12/2003 | Starta | H01R 13/71 |
| | | | 439/246 |
| 2014/0009925 A1 | 1/2014 | Verhoeven et al. | |
| 2018/0092186 A1* | 3/2018 | Stuby, Jr. | H05B 47/19 |
| 2019/0341732 A1 | 11/2019 | Aaron et al. | |
| 2020/0370742 A1* | 11/2020 | Zimmerman, III | H05B 47/19 |

* cited by examiner

US 11,482,817 B2

TWIST-LOCK CONNECTOR SYSTEM HAVING A LIGHT SENSOR ASSEMBLY

CROSS REFERENCE TO RELATED APPLICATIONS

This application claims benefit to U.S. Provisional Application No. 63/024,058, filed 13 May 2020, titled "TWIST-LOCK CONNECTOR SYSTEM HAVING A LIGHT SENSOR ASSEMBLY", the subject matter of which is herein incorporated by reference in its entirety.

BACKGROUND OF THE INVENTION

The subject matter herein relates generally to receptacle connectors for light sensor assemblies of light fixtures.

On outdoor lighting, notably street lights and parking lot lights, sensor components and the corresponding mating receptacles are typically used to turn the lights on and off based upon the ambient light from the sun. The sensor components and the mating receptacles are mated at a rotate-to-mate interface using twist-lock power contacts. Some light fixtures support dimming to variably control the light fixture based on the ambient light levels, time of day, and the like. There is a trend to provide programmable functions to the light fixtures based on sensors and programmable controls other than ambient light, such as, detected nearby pedestrian motion. To accommodate these functions, the lighting control receptacles provide low voltage control lines in addition to the high voltage power contacts. However, data communication on the low voltage control lines is limited. Integrating high speed electrical connectors in the rotate-to-mate interface is problematic. For instance, it is difficult to control the mating sequence of the contacts and prevent mating adjacent contacts during the twisting operation. The twisting operation leads to short circuits and potential damage to downstream and upstream equipment. Additionally, there are problems with tolerance stack up within the system. It is difficult to provide tolerance control to ensure that fine pitch high speed contacts are mated together for proper electrical performance and system impedance. Uncontrolled electrical impedance results in poor high speed data transmission performance.

A need remains for a cost effective and reliable light sensor assembly for a light fixture that allows high speed data communication between components.

BRIEF DESCRIPTION OF THE INVENTION

In one embodiment, a twist-lock connector system is provided. The twist-lock connector system includes a first twist-lock connector including a first connector housing holding first twist-lock contacts at a first rotate-to-mate interface. The first twist-lock connector includes a first high speed electrical connector held by the first connector housing. The first high speed electrical connector includes first high speed contacts. The first high speed electrical connector is movable relative to the first connector housing between a home position and a rotated position. The first twist-lock connector includes a biasing member coupled to the first high speed electrical connector to bias the first high speed electrical connector to the home position. A second twist-lock connector includes a second connector housing holding second twist-lock contacts at a second rotate-to-mate interface. The second twist-lock contacts are electrically connected to the first twist-lock contacts to transfer power between the first twist-lock connector and the second twist-lock connector. The second twist-lock connector includes a second high speed electrical connector held by the second connector housing. The second high speed electrical connector includes second high speed contacts electrically connected to the first high speed contacts to transfer high speed data between the first twist-lock connector and the second twist-lock connector.

In another embodiment, a twist-lock connector system is provided. The twist-lock connector system includes a plug connector including a plug connector housing and a sensor element held by the plug connector housing for sensing an environmental characteristic exterior of the plug connector. The plug connector includes twist-lock plug contacts held by the plug connector housing and extends from a mating interface of the plug connector housing. The plug connector includes a first high speed electrical connector held by the plug connector housing. The first high speed electrical connector includes first high speed contacts. The twist-lock connector system includes a receptacle connector coupled to the plug connector at a rotate-to-mate interface. The receptacle connector includes a receptacle connector housing having contact channels. The receptacle connector includes twist-lock receptacle contacts received in corresponding contact channels and is configured to receive the twist-lock plug contacts to transfer power between the receptacle connector and the plug connector. The receptacle connector includes a second high speed electrical connector held by the receptacle connector housing. The second high speed electrical connector includes second high speed contacts mated with corresponding first high speed contacts to transfer high speed data signals between the receptacle connector and the plug connector. The plug connector is rotated from a first mated position to a second mated position to lock the twist-lock plug contacts and the twist-lock receptacle contacts. One of the first high speed electrical connector or the second high speed electrical connector is fixed relative to the plug connector housing or the receptacle connector housing, respectively as the plug connector is rotated from the first mated position to the second mated position. The other of the first high speed electrical connector or the second high speed electrical connector is movable relative to the plug connector housing or the receptacle connector housing, respectively as the plug connector is rotated from the first mated position to the second mated position from a home position to a rotated position and being spring biased to return to the home position.

In a further embodiment, a light sensor assembly for mounting to a fixture housing of a light fixture is provided. The light sensor assembly includes a plug connector including a plug connector housing and a sensor element held by the plug connector housing for sensing an environmental characteristic exterior of the plug connector. The plug connector housing includes a base and a sensor lid extending from the base. The base has a bottom defining a mating interface. The base includes a guide track and a slot at a bottom of the guide track open at the bottom of the base. The plug connector includes twist-lock plug contacts coupled to the base and extending from the bottom of the base. The plug connector includes a first high speed electrical connector held by the plug connector housing in the guide track and extending through the slot from the bottom of the base. The first high speed electrical connector includes first high speed contacts. The first high speed electrical connector is movable in the guide track and the slot from a home position to a rotated position. The plug connector includes a biasing member coupled to the first high speed electrical connector to bias the first high speed electrical connector to the home position. The light sensor assembly includes a receptacle connector configured to be coupled to the light fixture to control operation of the light fixture. The receptacle connector is coupled to the plug connector at a rotate-to-mate interface. The receptacle connector includes a receptacle connector housing having contact channels. The receptacle connector includes twist-lock receptacle contacts received in corresponding contact channels and is configured to receive the twist-lock plug contacts to transfer power between the receptacle connector and the plug connector. The receptacle connector includes a second high speed electrical connector held by the receptacle connector housing. The second high speed electrical connector includes second high speed contacts mated with corresponding first high speed contacts to transfer high speed data signals between the receptacle connector and the plug connector.

In another embodiment, a light sensor assembly for mounting to a fixture housing of a light fixture is provided. The light sensor assembly includes a plug connector including a plug connector housing and a sensor element held by the plug connector housing for sensing an environmental characteristic exterior of the plug connector. The plug connector housing includes a base and a sensor lid extending from the base. The base has a bottom defining a mating interface. The plug connector includes twist-lock plug contacts coupled to the base and extending from the bottom of the base. The plug connector includes a first high speed electrical connector held by the plug connector housing. The first high speed electrical connector includes first high speed contacts. The light sensor assembly includes a receptacle connector configured to be coupled to the light fixture to control operation of the light fixture, the receptacle connector coupled to the plug connector at a rotate-to-mate interface. The receptacle connector includes a receptacle connector housing having contact channels extending from a top of the receptacle connector housing. The receptacle connector includes twist-lock receptacle contacts received in corresponding contact channels and is configured to receive the twist-lock plug contacts to transfer power between the receptacle connector and the plug connector. The receptacle connector housing includes a guide track and a slot at the top of the receptacle connector housing. The receptacle connector includes a second high speed electrical connector held by the receptacle connector housing. The second high speed electrical connector includes second high speed contacts mated with corresponding first high speed contacts to transfer high speed data signals between the receptacle connector and the plug connector. The second high speed electrical connector is movable in the guide track and the slot from a home position to a rotated position. The plug connector includes a biasing member coupled to the second high speed electrical connector to bias the second high speed electrical connector to the home position.

BRIEF DESCRIPTION OF THE DRAWINGS

FIG. 12 is a partial sectional view of a portion of the plug connector in accordance with an exemplary embodiment.

DETAILED DESCRIPTION OF THE INVENTION

Figure 1:
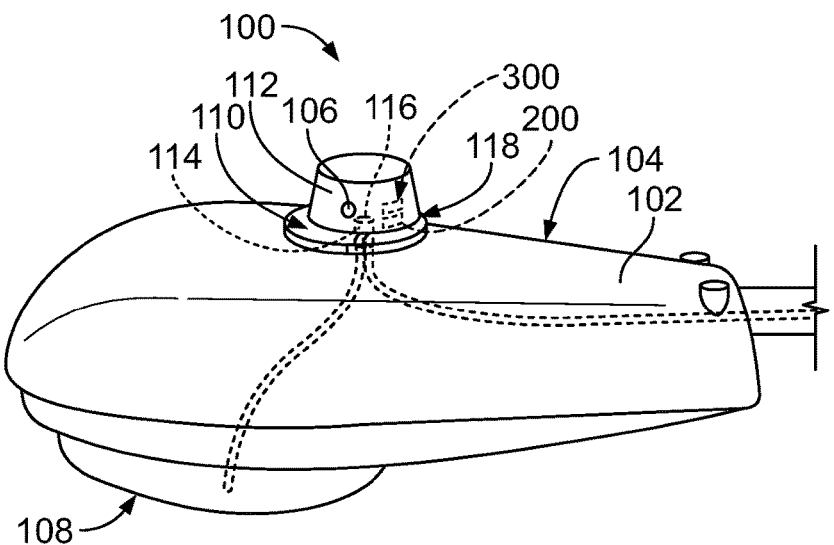
FIG. 1 illustrates a light sensor assembly formed in accordance with an exemplary embodiment.

FIG. 1 illustrates a light sensor assembly 100 formed in accordance with an exemplary embodiment. The light sensor assembly 100 is mounted to a fixture housing 102 of a light fixture 104, such as a roadway light, a parking lot light, a street light, and the like, or to another component, such as the pole or other structure supporting the light fixture 104, or to another component unassociated with the light fixture, such as a parking meter, a telephone pole or another structure. The light sensor assembly 100 holds one or more sensors or sensor components 106 that may be used for environmental monitoring or to control the light fixture 104, such as for turning a lighting element 108 of the light fixture 104 on or off depending upon light levels, for dimming control of the lighting element 108, or for controlling other functions. The lighting element 108 may be an LED lighting element in various embodiments. The sensor components 106 may be used for other functions other than controlling the light fixture 104, such as remote monitoring of the environmental surroundings of the fixture housing 102, such as for parking monitoring, for street flow activity monitoring, or other functions. The sensor component(s) 106 may be a photocell or light sensor used to detect ambient light from the sun. Other types of sensor components 106, such as object identification sensors, motion sensors, timing sensors or other types of environmental sensors may be included in the light sensor assembly 100.

The light sensor assembly 100 includes a receptacle connector 110 and a plug connector 112 coupled to the receptacle connector 110. In an exemplary embodiment, the connectors 110, 112 are twist-lock connectors and may be referred to hereinafter as twist-lock connectors 110, 112. The twist-lock connectors 110, 112 are mated at a rotate-to-mate interface. For example, the twist-lock connectors 110, 112 are initially mated in a plug mating direction along a mating axis and are finally mated in a rotate mating direction by rotating the twist lock connector 110 and/or the twist-lock connector 112 to lock the connectors 110, 112 together. In an exemplary embodiment, the receptacle connector 110 is a twist-lock photocontrol receptacle connector and the plug connector 112 is a twist-lock photocontrol plug connector, such as connectors being ANSI C136.x compliant.

The receptacle connector 110 forms the bottom of the light sensor assembly 100. The receptacle connector 110 may be directly mounted to the fixture housing 102 of the light fixture 104. The plug connector 112 forms the top of the light sensor assembly 100, which holds the sensor components 106. For example, the plug connector 112 houses or surrounds the sensor component 106, such as to provide environmental protection for the sensor component 106.

In an exemplary embodiment, power and data may be transmitted between the plug connector 112 and the receptacle connector 110 across the mating interface 118. The connectors 110, 112 include power contacts 114, 116 (shown in phantom in FIG. 2), respectively, at a mating interface 118. For example, the power contacts 114, 116 may be twist-lock power contacts. The power contacts 114, 116 may be high voltage power contacts. In various embodiments, the connectors 110, 112 may include low speed data contacts for transmitting low speed data signals across the mating interface 118. For example, control signals may be transmitted by the low speed data contacts from the plug connector 112 to the receptacle connector 110 for controlling operation of the light fixture 104. The control signals may be based on sensor data gathered by the sensor component 106. In an exemplary embodiment, the twist-lock connectors 110, 112 include high speed electrical connectors 200, 300, respectively, for transmitting high speed data between the twist-lock connectors 110, 112. At least one of the high speed electrical connectors 200, 300 is movable relative to the housings of the connectors 110, 112 to accommodate the rotated mating action. For example, in various embodiments, one of the high speed electrical connectors 200, 300 is fixed to the its housing, while the other high speed electrical connector 200, 300 is movable relative to its housing.

Figure 2:
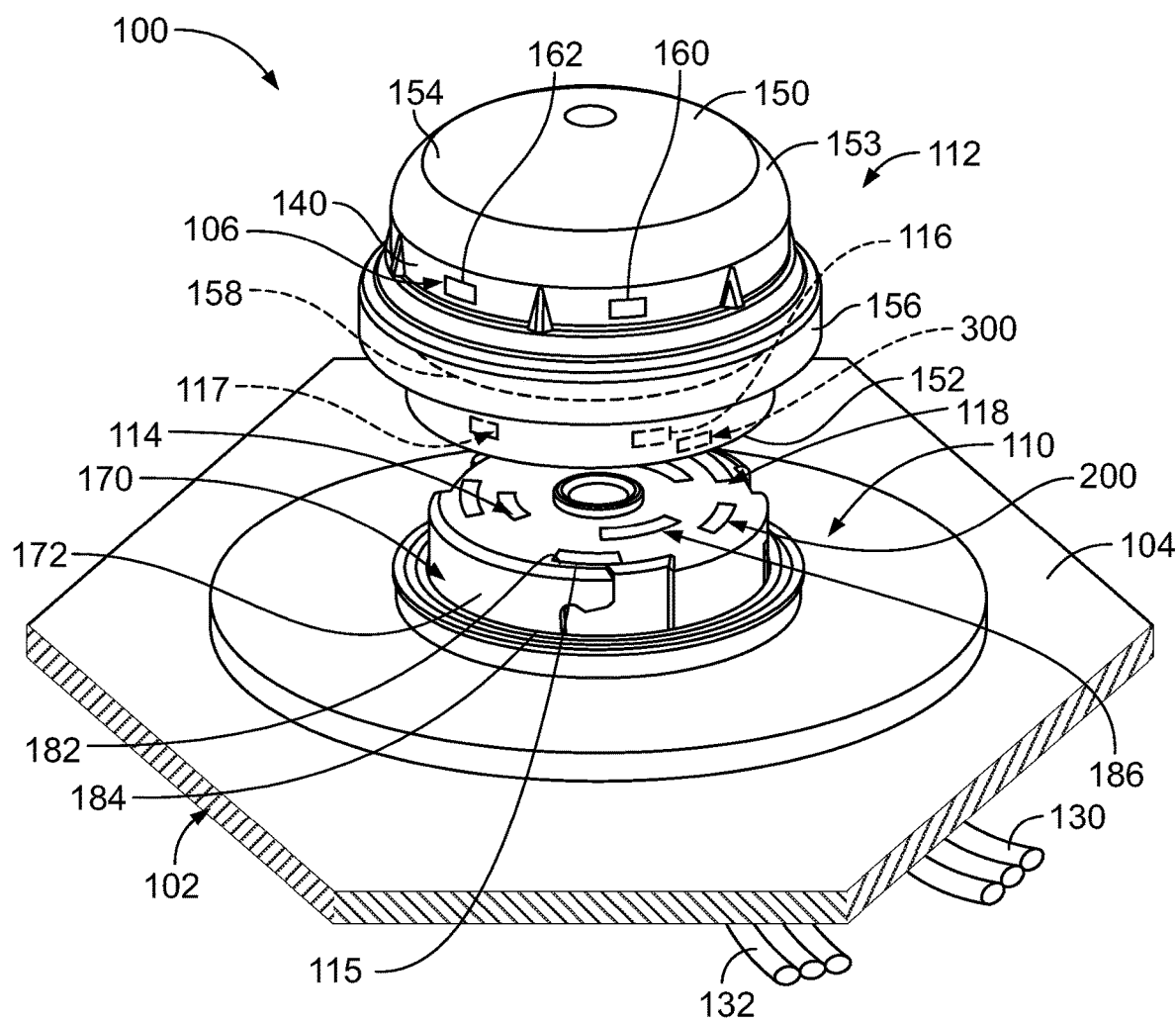
FIG. 2 is an exploded perspective view of the light sensor assembly in accordance with an exemplary embodiment showing the plug connector poised for mating with the receptacle connector.

FIG. 2 is an exploded perspective view of the light sensor assembly 100 in accordance with an exemplary embodiment showing the plug connector 112 poised for mating with the receptacle connector 110. The connectors 110, 112 hold the power contacts 114, 116. Optionally, a seal (not shown) may be provided between the receptacle connector 110 and the plug connector 112 to seal the light sensor assembly 100 at the mating interface 118 from environmental containments such as water, debris, and the like.

The light sensor assembly 100 may include wires 130 extending from the receptacle connector 110. The wires 130 are terminated to corresponding receptacle contacts 114. The wires 130 may be power in or power out wires bringing power to the light sensor assembly 100 from a power source or bringing power from the contacts 114 to another component, such as the lighting element 108 or a driver board for the lighting element of the light fixture 104. In various embodiments, the wires 130 may include a line wire, a load wire, a neutral wire or other types of wires.

The light sensor assembly 100 may additionally include signal wires 132 extending from the receptacle connector 110. The signal wires 132 may be electrically connected to corresponding signal contacts of the high speed electrical connector 200. The signal wires 132 may be electrically connected to other components, such as a control module or driver board of the light fixture 104. The signal wires 132 may transmit data to or from the receptacle connector 110 for data communication with the plug connector 112. For example, the signal wires 132 may be electrically connected to another component, such as a video camera, to transmit video signals to the plug connector 112. Alternatively, the signal wires may receive video signals from the plug connector 112.

The receptacle connector 110 includes a receptacle connector housing 170 having a base 172 extending between a top 182 and a bottom 184. The bottom 184 of the base 172 is configured to be secured to the fixture housing 102. The base 172 holds the power contacts 114 and low speed signal contacts 115. The low speed signal contacts 115 are provided at the top 182 for interfacing with the plug connector 112. Optionally, the power contacts 114 may be entirely contained within the base 172 and protected from the environment by the base 172. For example, the power contacts 114 may be held in contact channels 186 within the base 172. The wires 130 may extend into the contact channels 186 for termination to the power contacts 114. Optionally, the contact channels 186 include arcuate or curved slots or openings in the base 172 for twist-lock mating with the sensor contacts. In an exemplary embodiment, the high speed electrical connector 200 is coupled to the receptacle connector housing 170, such as to the base 172. The high speed electrical connector 200 may be fixed relative to the receptacle connector housing 170 in various embodiments. The high speed electrical connector 200 may be movably coupled relative to the receptacle connector housing 170 in other various embodiments.

In an exemplary embodiment, the receptacle connector 110 is generally cylindrical shaped, such as to allow easy rotation of the plug connector 112 relative to the receptacle connector 110 and/or to allow easy rotation of the receptacle connector 110 relative to the fixture housing 102. However, the receptacle connector 110 may have other shapes and alternative embodiments. In an exemplary embodiment, the plug connector 112 may be rotatable relative to the receptacle connector 110, such as to allow rotating mating of the plug connector 112 with the receptacle connector 110.

The plug connector 112 includes a plug connector housing 140 extending between a top 150 and a bottom 152 opposite the top 150. The plug connector housing 140 has a mating interface at the bottom 152 configured to be secured to the receptacle connector 110. In an exemplary embodiment, the plug connector 112 includes a sensor lid 154 at the top 150 of the housing 140 and a base 156 at the bottom 152. The sensor lid 154 may include a dome configured to circumferentially surrounding the base 156 of the receptacle connector 110. The sensor components 106 are arranged in the sensor lid 154. In an exemplary embodiment, the plug connector 112 is cylindrical shaped, such as to allow easy rotation of the plug connector 112 relative to the receptacle connector 110, such as during mating. However, the plug connector 112 may have other shapes and alternative embodiments.

In an exemplary embodiment, a circuit board 158 (shown in phantom) is arranged in the base 156 and/or the sensor lid 154. The sensor component(s) 106 may be coupled to the circuit board 158, such as being mounted to the circuit board 158. Other components may be mounted to the circuit board 158. For example, a control module and/or communication device may be mounted to the circuit board 158.

The power contacts 116 (shown in phantom) are held by the housing 140, such as being held by the base 156. The power contacts 116 may be terminated to the circuit board 158. The power contacts 116 extend from the bottom 152 of the plug connector 112 for mating with the power contacts 114. The power contacts 116 may be arranged generally around a central axis. Optionally, the power contacts 116 may be twist lock contacts. For example, the power contacts 116 may be curved and fit in curved contact channels in the receptacle connector 110 to mate with corresponding curved power contacts 114. In an exemplary embodiment, the plug connector 112 may be twisted or rotated to lock the power contacts 116 in the receptacle connector 110, such as in electrical contact with the receptacle contacts 114. For example, the contacts 116 may be twist-lock contacts that are initially loaded into the contact channels in a vertical direction and the plug connector 112 is then rotated, such as approximately 35 degrees, to lock the contacts 116 in the receptacle connector 110. Other types of mating arrangements between the contacts 116 and the receptacle connector 110 are possible in alternative embodiments.

Low speed signal contacts 117 (shown in phantom) may be held by the plug connector housing 140, such as being held by the base 156. The signal contacts 117 may be terminated to the circuit board 158. The signal contacts 117 may extend from the bottom 152 of the plug connector 112 for mating with the power contacts 114. The signal contacts 117 may be arranged generally around a central axis. Optionally, the signal contacts 117 may be spring beam contacts; however, the signal contacts 117 may be other types of contacts.

The high speed electrical connector 300 (shown in phantom) is coupled to the plug connector housing 140, such as to the base 156. The high speed electrical connector 300 may extend from the top 150, such as for plugging into the high speed electrical connector 200. In an exemplary embodiment, the high speed electrical connector 300 is movably coupled relative to the plug connector housing 140. For example, as the plug connector 112 is twisted to mate with the receptacle connector 110, the plug connector housing 140 rotates relative to the high speed electrical connector 300, which does not rotate once being mated with the high speed electrical connector 200.

In an exemplary embodiment, the plug connector 112 includes different types of environmental sensor components 106 for sensing different events. For example, the plug connector 112 includes a photocell 160. The photocell 160 is used for sensing ambient light and is used to control operation of the light fixture 104, such as for turning the light fixture 104 on or off depending upon light levels or for dimming control of the light fixture 104. Optionally, the photocell 160 may be mounted to the circuit board and/or the sensor lid 154. The signal contacts and the photocell 160 may be electrically connected via the circuit board. The circuit board may include additional componentry for signal conditioning. For example, the circuit board may have control circuitry for controlling operation of the light fixture 104, such as including a daylight or nighttime control circuit, a timer circuit, a dimming circuit, and the like. Data from the photocell 160 may be transmitted through the signal contacts across the mating interface 118.

In an exemplary embodiment, the plug connector 112 includes one or more other environmental sensors 162 for sensing an environmental characteristic other than ambient light exterior of the plug connector 112 in the environment exterior of the plug connector 112. For example, the sensor 162 may be a motion sensor or an object sensor configured to sense movement or presence of an object, such as a person or vehicle in a particular area. The sensor 162 may be used for parking monitoring, for street flow activity monitoring, for pedestrian monitoring, or other functions. The sensor 162 may be mounted to the circuit board. In an exemplary embodiment, the sensor 162 is electrically connected to the signal contacts via the circuit board.

Figure 3:
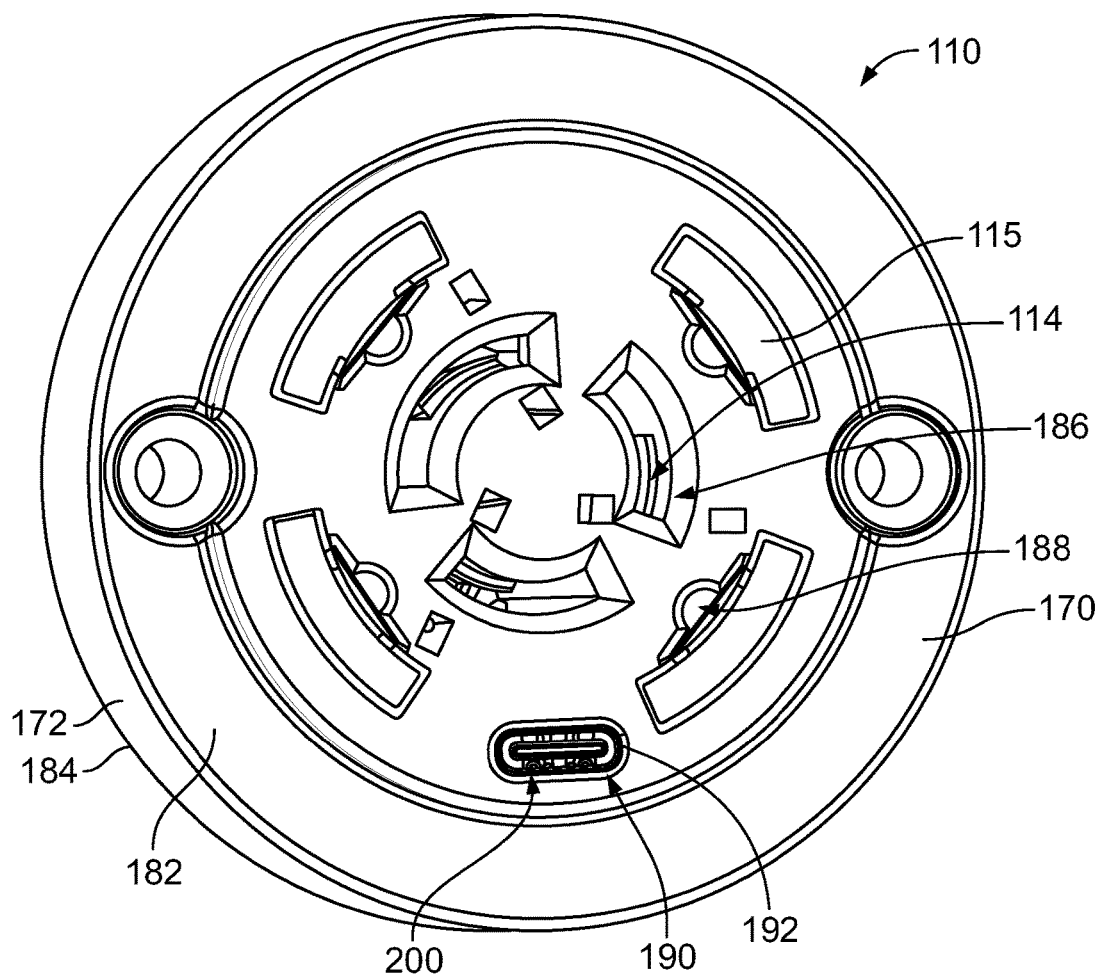
FIG. 3 is a front perspective view of the receptacle connector in accordance with an exemplary embodiment.
Figure 4:
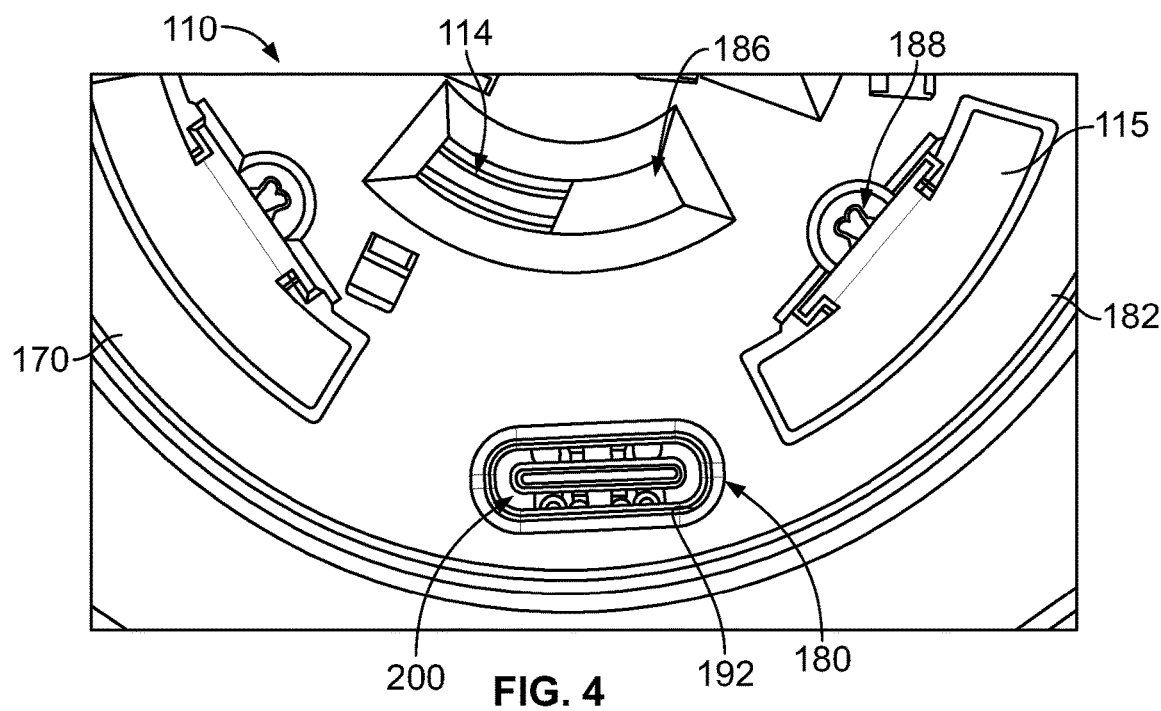
FIG. 4 is an enlarged front view of the receptacle connector in accordance with an exemplary embodiment.

FIG. 3 is a front perspective view of the receptacle connector 110 in accordance with an exemplary embodiment. FIG. 4 is an enlarged front view of the receptacle connector 110 in accordance with an exemplary embodiment. The receptacle connector housing 170 holds the power contacts 114, the signal contacts 115 and the high speed electrical connector 200. In an exemplary embodiment, the receptacle connector housing 170 includes a central hub 174 (shown in FIG. 5) extending from the bottom 184 of the base 172. The contact channels 186 extend through the base 172 in the hub 174. The power contacts 114 are received in the contact channels 186. In the illustrated embodiment, the power contacts 114 are twist lock receptacle contacts.

In an exemplary embodiment, the receptacle connector housing 170 includes contact channels 188 that receive the signal contacts 115. In the illustrated embodiment, the signal contacts 115 include contact pads at the top 182 of the receptacle connector housing 170. The pads are configured to receive the signal contacts 117 of the plug connector 112 (shown in FIG. 2). The signal contacts 115 may include alternative mating interfaces in alternative embodiments, such as spring beams, pins, sockets, and the like. In the illustrated embodiment, four signal contacts 115 are provided arranged in different quadrants of the receptacle connector housing 170. Greater or fewer signal contacts 115 may be provided in alternative embodiments. The signal contacts 115 may be arranged at other locations in alternative embodiments.

In an exemplary embodiment, the receptacle connector housing 170 includes an opening 190 that receives the high speed electrical connector 200. In the illustrated embodiment, the opening 190 is provided at the top 182. The opening 190 provides access to the high speed electrical connector 200, which is coupled to the backside of the base 172. In the illustrated embodiment, the opening 190 is oval-shaped. The opening 190 may have other shapes in alternative embodiments in an exemplary embodiment, the receptacle connector housing 170 includes guide features 192 adjacent the opening 190 to guide the high speed electrical connector 300 into the opening 190 to mate with the high speed electrical connector 200. For example, the guide features 192 may include chamfered edges surrounding the opening 190. Other types of guide features may be used in alternative embodiments. The guide features 192 may extend from the top 182.

Figure 5:
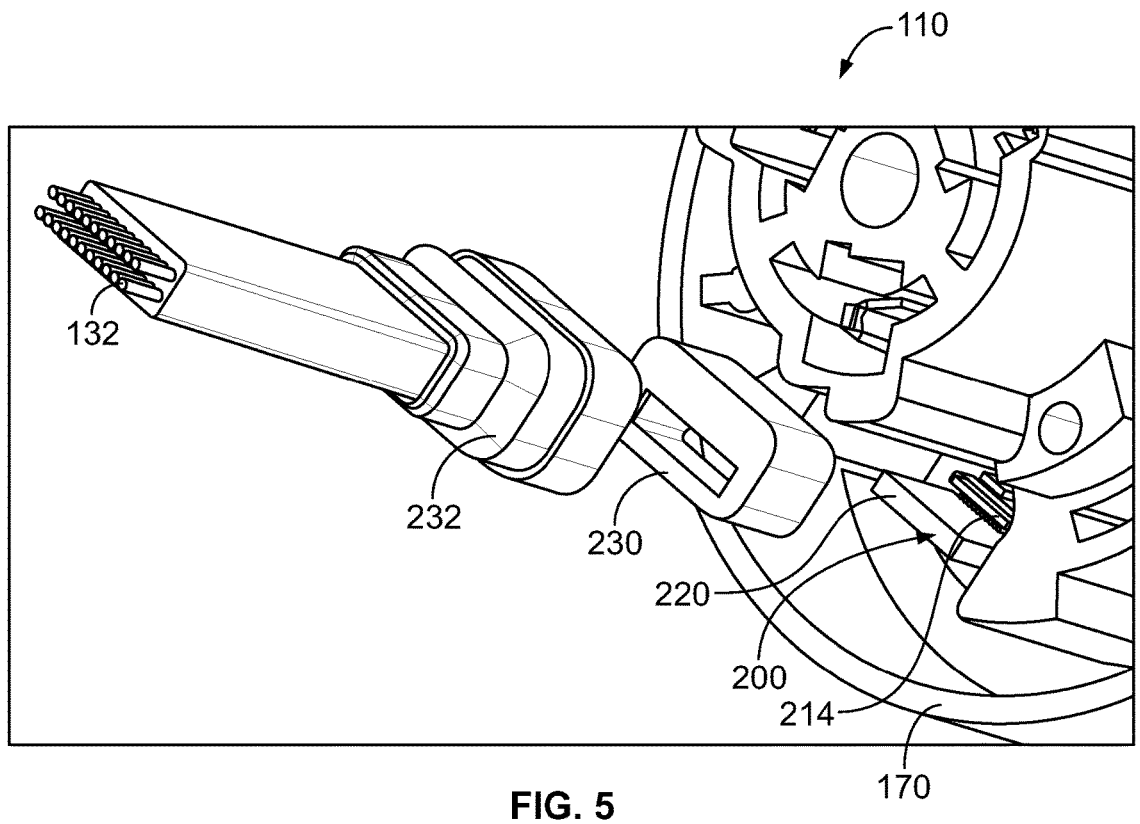
FIG. 5 is a rear perspective view of a portion of the receptacle connector in accordance with an exemplary embodiment.
Figure 6:
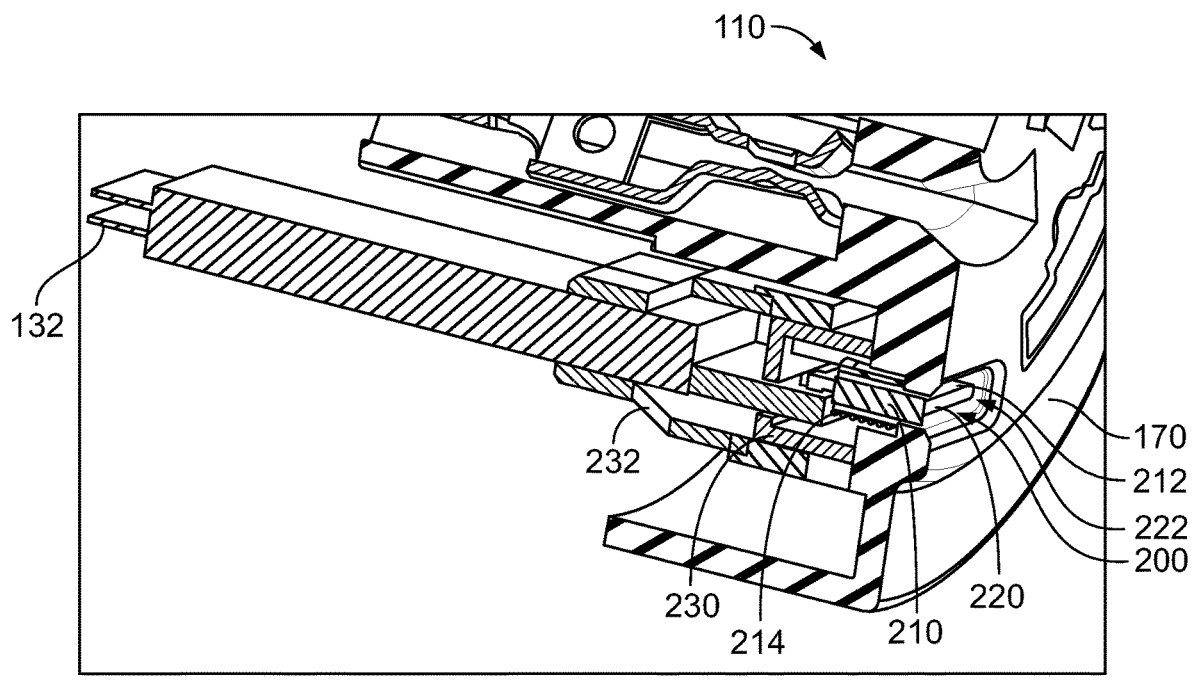
FIG. 6 is a sectional view of a portion of the receptacle connector in accordance with an exemplary embodiment.

FIG. 5 is a rear perspective view of a portion of the receptacle connector 110 in accordance with an exemplary embodiment. FIG. 6 is a sectional view of a portion of the receptacle connector 110 in accordance with an exemplary embodiment. FIGS. 5 and 6 illustrate the high speed electrical connector 200 coupled to the receptacle connector housing 170. The signal wires 132 are configured to be electrically connected to the high speed electrical connector 200. In the illustrated embodiment, the signal wires 132 are bundled together within a cable.

In an exemplary embodiment, the high speed electrical connector 200 includes a connector housing 210 holding high speed contacts 212. The high speed electrical connector 200 includes a shield 214 providing electrical shielding for the high speed contacts 212. Optionally, the shield 214 may be stamped and formed and coupled to the connector housing 210. In alternative embodiments, the shield 214 may be a plating or coating provided on the connector housing 210.

In the illustrated embodiment, the high speed electrical connector 200 is a USBc receptacle connector. However, other types of high speed electrical connectors may be used in alternative embodiments. In the illustrated embodiment, the high speed electrical connector 200 is a socket connector. Alternatively, the high speed electrical connector 200 may be a plug connector or another type of electrical connector.

In an exemplary embodiment, the high speed electrical connector 200 includes a circuit card 220. The high speed contacts 212 are provided on the circuit card 220. For example, the high speed contacts 212 may be traces or circuits of the circuit card 220. The high speed contacts 212 may include contact pads provided at or near a mating edge of the circuit card 220. The connector housing 210 includes a cavity 222 that receives the circuit card 220. In alternative embodiments, rather than having the circuit card 220, the high speed electrical connector 200 may include individual high speed contacts 212 held within the connector housing 210. For example, stamped and formed contacts may be held by the connector housing 210. The signal wires 132 are electrically connected to the high speed contacts 212. For example, the signal wires 132 may be electrically connected to the circuit card 220. In the illustrated embodiment, a paddle card provides an interface between the circuit card 220 and the signal wires 132. Alternatively, the signal wires 132 may be terminated directly to the circuit card 220.

In an exemplary embodiment, the high speed electrical connector 200 includes a cover 230. The cover 230 may be coupled to the receptacle connector housing 170. The cover 230 may surround the connector housing 210 and/or the shield 214. In an exemplary embodiment, a cable ferrule 232 is coupled to the cover 230. The cable ferrule 232 may provide strain relief for the signal wires 132.

Figure 7:
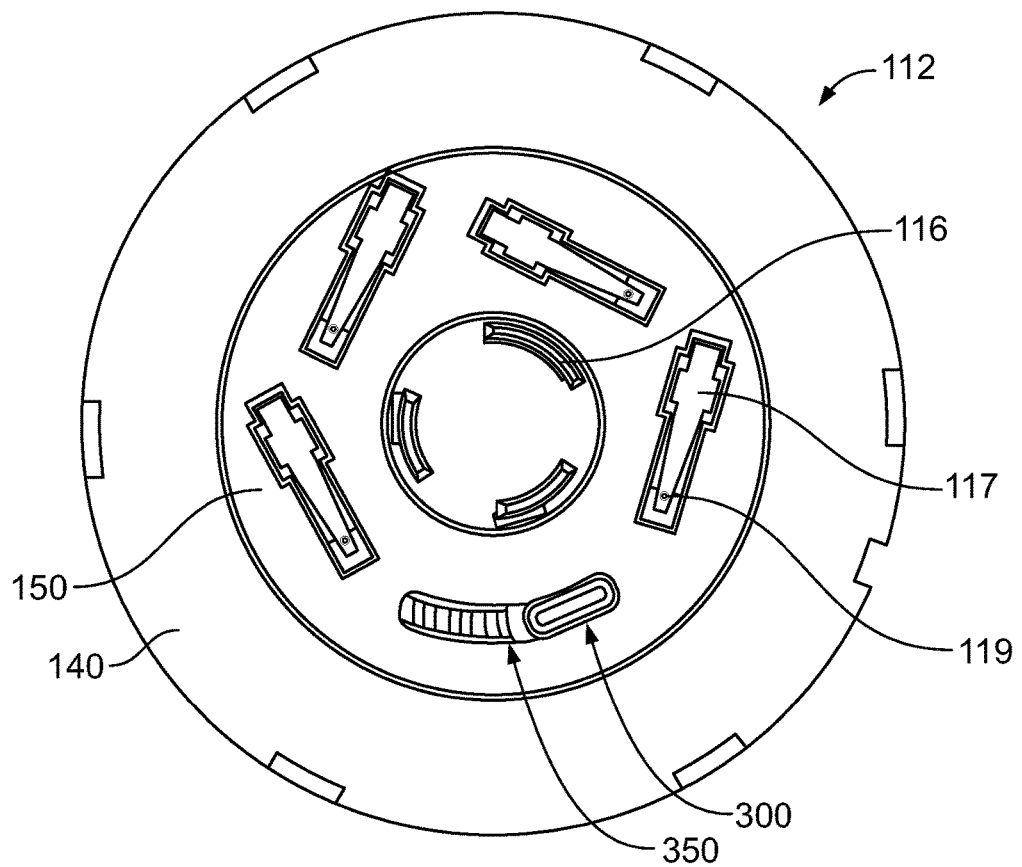
FIG. 7 is a front perspective view of the plug connector in accordance with an exemplary embodiment.
Figure 8:
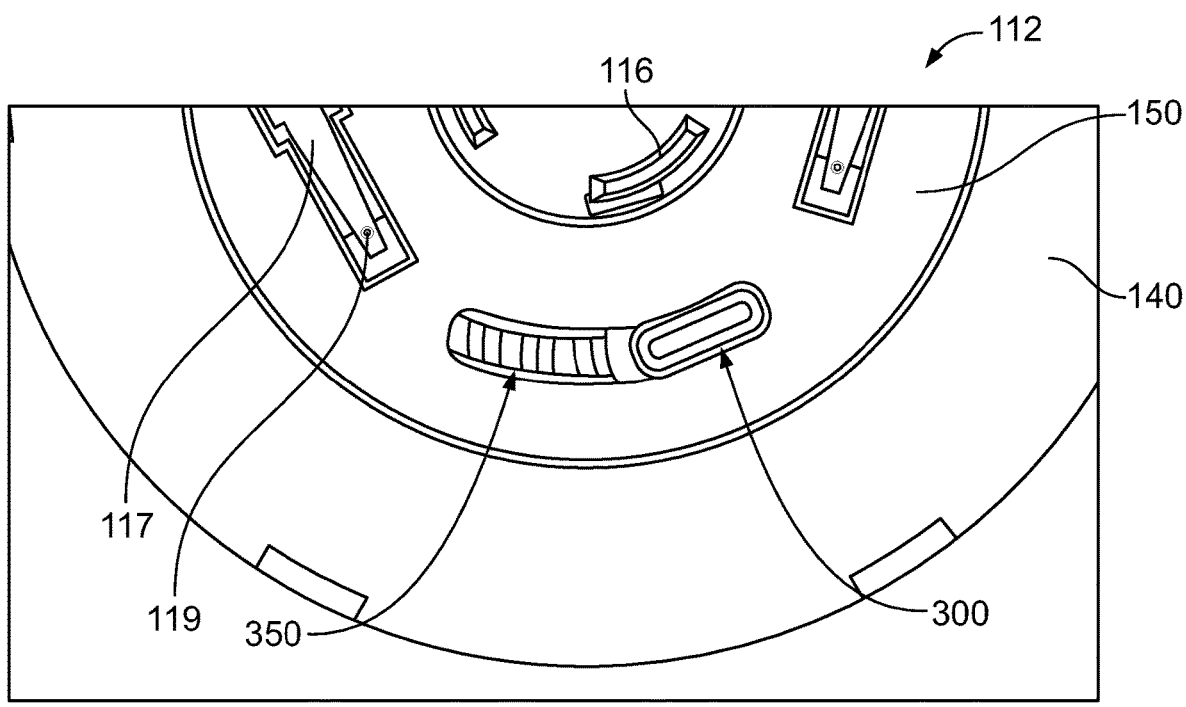
FIG. 8 is an enlarged front view of the plug connector in accordance with an exemplary embodiment.

FIG. 7 is a front perspective view of the plug connector 112 in accordance with an exemplary embodiment. FIG. 8 is an enlarged front view of the plug connector 112 in accordance with an exemplary embodiment. The plug connector housing 140 holds the power contacts 116, the signal contacts 117 and the high speed electrical connector 300. The power contacts 116 are received in contact channels in the plug connector housing 140. In the illustrated embodiment, the power contacts 116 are twist lock blade contacts.

The signal contacts 117 are provided at the top 150 for mating with the signal contacts 115 of the receptacle connector 110. In the illustrated embodiment, the signal contacts 117 include deflectable spring beams. Other types of contacts may be provided in alternative embodiments, such as contact pads, pins, sockets, and the like. In the illustrated embodiment, four signal contacts 117 are provided; however, greater or fewer signal contacts 117 may be provided in alternative embodiments. The signal contacts 117 may be arranged at other locations in alternative embodiments. In an exemplary embodiment, each signal contact 117 includes a contact interface 119 configured to interface with the corresponding signal contacts 115 of the receptacle connector 110. In the illustrated embodiment, the contact interfaces 119 are arranged in a complementary arrangement as the signal contacts 115. For example, the contact interfaces 119 are arranged in four quadrants to interface with the signal contacts 115. However, bases of the signal contacts 117 have a different arrangement in the signal contacts 115. For example, the bases of the signal contacts 117 are shifted closer together (compared to the signal contacts 115) to make space for the high speed electrical connector 300.

In an exemplary embodiment, the plug connector housing 140 includes an elongated slot 350 that receives the high speed electrical connector 300. In the illustrated embodiment, the slot 350 extends along a curved or arcuate path. The curved path allows relative motion between the plug connector housing 140 and the high speed electrical connector 300, such as during the twist lock process. The slot 350 is open at the top 150 to allow the high speed electrical connector 300 to pass into or through the slot 350. The slot 350 may have other shapes in alternative embodiments.

Figure 9:
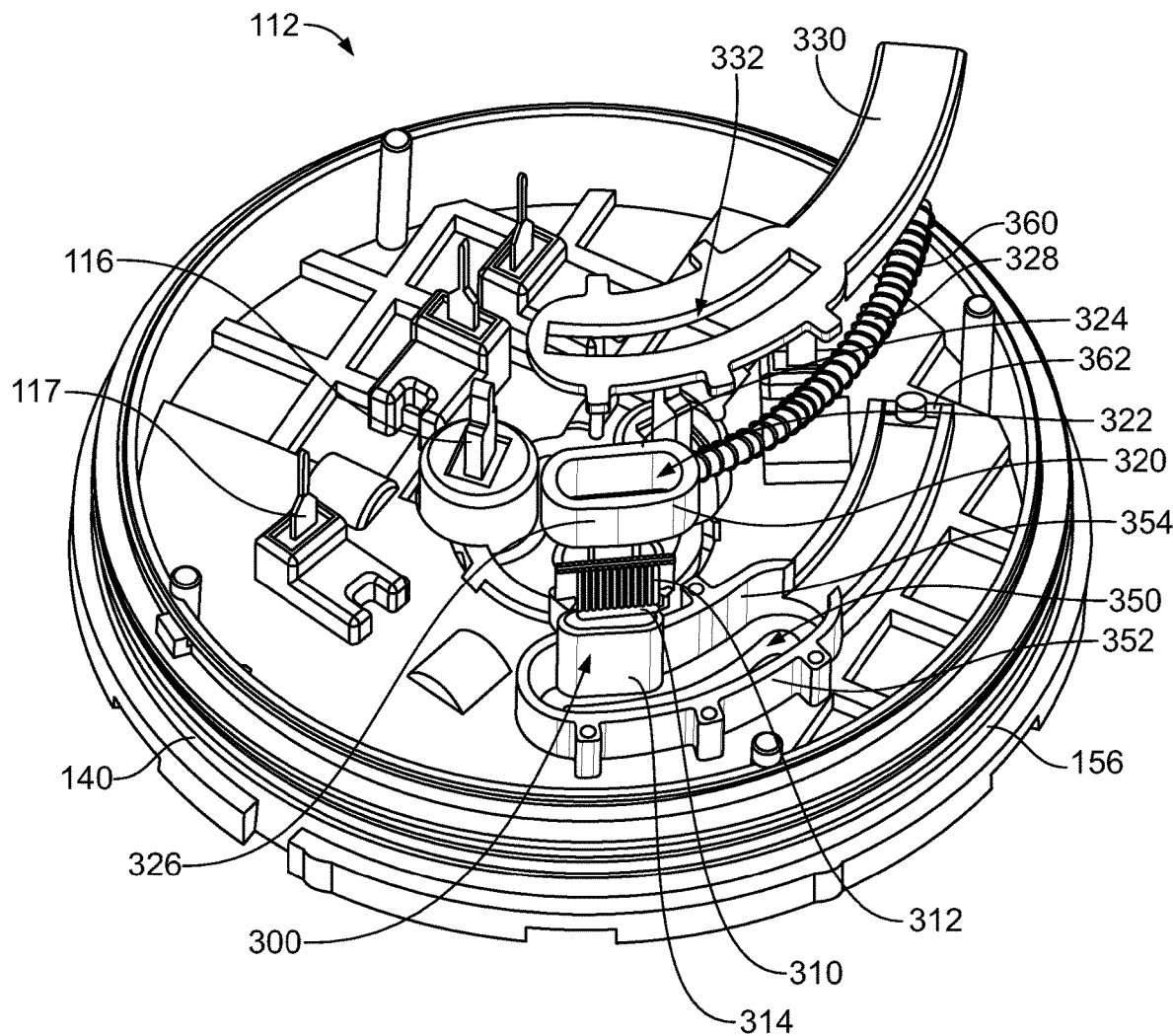
FIG. 9 is an exploded, rear perspective view of a portion of the plug connector in accordance with an exemplary embodiment.
Figure 10:
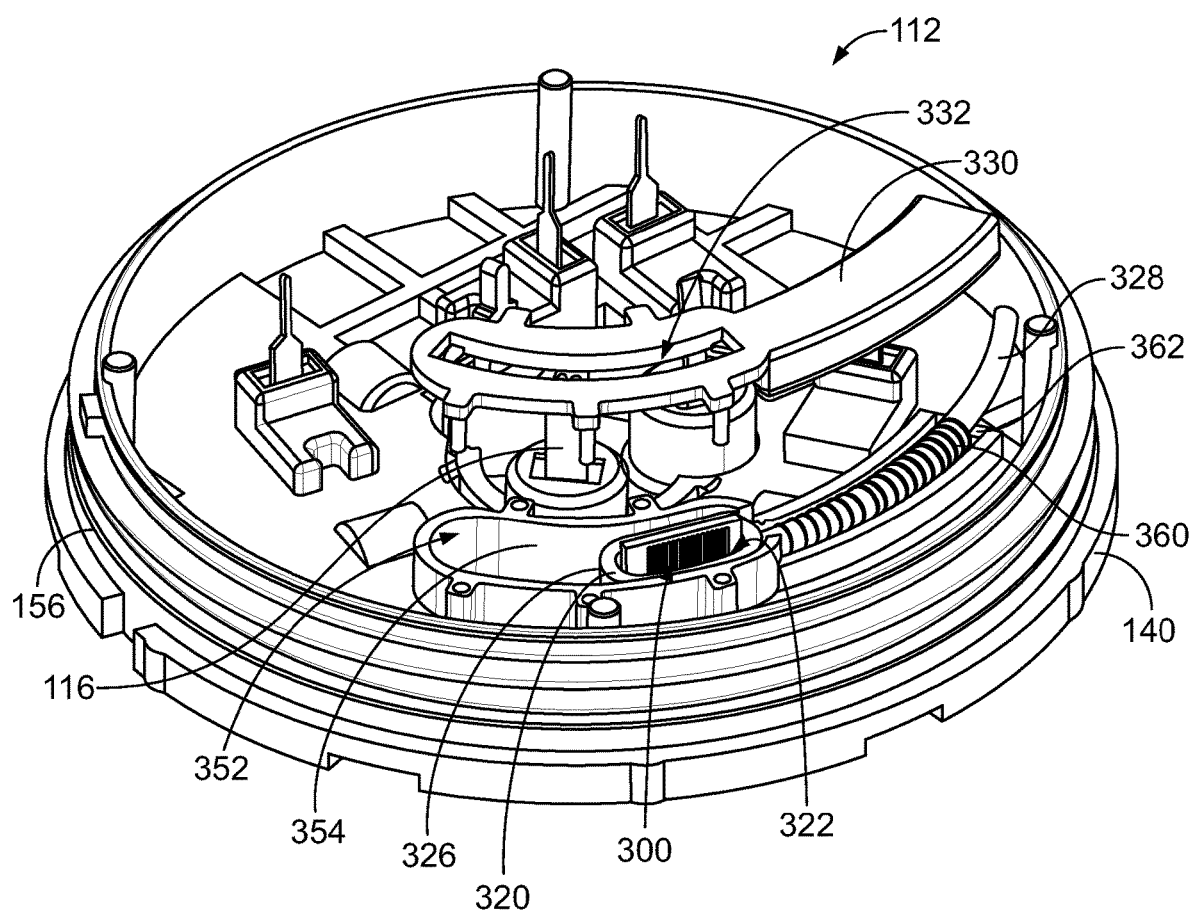
FIG. 10 is a rear, partially assembled view of a portion of the plug connector in accordance with an exemplary embodiment.

FIG. 9 is an exploded, rear perspective view of a portion of the plug connector 112 in accordance with an exemplary embodiment. FIG. 10 is a rear, partially assembled view of a portion of the plug connector 112 in accordance with an exemplary embodiment. FIGS. 9 and 10 illustrate the high speed electrical connector 300 and the plug connector housing 140.

In an exemplary embodiment, the high speed electrical connector 300 includes a connector housing 310 holding high speed contacts 312. The high speed electrical connector 300 includes a shield 314 providing electrical shielding for the high speed contacts 312. Optionally, the shield 314 may be stamped and formed and coupled to the connector housing 310. In alternative embodiments, the shield 314 may be a plating or coating provided on the connector housing 310. In the illustrated embodiment, the high speed electrical connector 300 is a USBc plug connector. However, other types of high speed electrical connectors may be used in alternative embodiments. In the illustrated embodiment, the high speed electrical connector 300 is a plug connector. Alternatively, the high speed electrical connector 300 may be a socket connector or another type of electrical connector.

The connector housing 310 includes a cavity 322 that receives the high speed contacts 312. For example, the high speed contacts 312 may be stamped and formed contacts held by the connector housing 310. Other types of contacts may be used in alternative embodiments. In various embodiments, the high speed contacts 312 may be provided on a circuit card.

In an exemplary embodiment, the plug connector 112 includes a connector holder 320 used to hold the high speed electrical connector 300 relative to the plug connector housing 140. The connector holder 320 includes a cavity 322 that receives the high speed electrical connector 300. The connector holder 320 has one or more walls 324 surrounding the cavity 322. The walls 324 have exterior surfaces 326. The exterior surfaces 326 are configured to engage the plug connector housing 140 to position the connector holder 320 and the high speed electrical connector 300 relative to the plug connector housing 140. In an exemplary embodiment, the connector holder 320 includes a tail 328 extending from the wall 324. In various embodiments, the tail 328 may be curved. In an exemplary embodiment, the plug connector 112 includes a cover 330. The cover 330 is configured to be coupled to the plug connector housing 140 to couple the connector holder 320 and the high speed electrical connector 300 to the plug connector housing 140. In the illustrated embodiment, the cover 330 has a curved or arcuate shape.

In an exemplary embodiment, the plug connector housing 140 includes a guide track 352 at the upper surface of the base 156. The guide track 352 receives the connector holder 320 and the high speed electrical connector 300. The slot 350 is open to the guide track 352. The guide track 352 has a complementary shape as the elongated slot 350. The guide track 352 guides relative positioning between the high speed electrical connector 300 and the plug connector housing 140 during the twist lock mating process. For example, as the plug connector housing 140 is rotated, the guide track 352 moves along the connector holder 320 and the high speed electrical connector 300, which may remain fixed as the plug connector housing 140 is rotated. The guide track 352 includes a first space for the connector holder 320 and a second space for the tail 328. In an exemplary embodiment, guide walls 354 define the guide track 352. The guide walls 352 may be curved. In an exemplary embodiment, the walls 324 of the connector holder 320 may have a similar curvature as the guide walls 354 to allow smooth movement between the connector holder 320 and the plug connector housing 140.

In an exemplary embodiment, the plug connector 112 includes a biasing member 360 coupled between the high speed electrical connector 300 and the plug connector housing 140. In various embodiments, the biasing member 360 is coupled to the connector holder 320, which holds the high speed electrical connector 300. Alternatively, the biasing member 360 may directly engage the high speed electrical connector 300. The biasing member 360 is used to bias the high speed electrical connector 300 toward a home position relative to the plug connector housing 140. The biasing member 360 may be compressed or deflected when the plug connector housing 140 is rotated, such as to lock the power contacts 116 with the power contacts 114. The biasing member 360 may be extended when the plug connector housing 140 is unmated from the receptacle connector 110. As such, the biasing member 360 may hold the high speed electrical connector 300 in the home position to orient the high speed electrical connector 300 for mating with the high speed electrical connector 200 of the receptacle connector 110. In the illustrated embodiment, the biasing member 360 is a coil spring. Other types of springs may be used in alternative embodiments. Other types of biasing elements may be used in other various embodiments other than a spring. In an exemplary embodiment, the biasing member 360 is received in the second portion of the guide track 352 with the tail 328. The biasing member 360 is configured to engage a stop wall 362 of the plug connector housing 140 to position the biasing member 360 relative to the plug connector housing 140. The biasing member 360 may be compressed against the stop wall 362 when the plug connector housing 140 is rotated. In an exemplary embodiment, the tail 328 passes through a center of the coil spring such that the biasing member 360 follows the curved shape of the tail 328. In the illustrated embodiment, the biasing member 360 is positioned to push the connector holder 320 and the high speed electrical connector 300 back to the home position. Alternatively, the biasing member 360 may be configured to all of the connector holder 320 and the high speed electrical connector 300 to the home position. For example, rather than being compressed as the plug connector housing 140 is rotated, the biasing member 360 may be stretched as the plug connector housing 140 is rotated causing the biasing member 360 to retracted and all the connector holder 320 and the high speed electrical connector 300 back to the home position.

In an exemplary embodiment, the cover 330 is used to cover the connector holder 320 and the biasing member 360. Optionally, the cover 330 may be coupled to the guide track 352. The cover 330 may retain the biasing member 360 in the guide track 352. In an exemplary embodiment, the cover 330 includes an elongated slot 332 that receives the high speed electrical connector 300. The high speed electrical connector 300 may move relative to the cover 330 within the slot 332. The slot 332 may be aligned with the slot 350.

Figure 11:
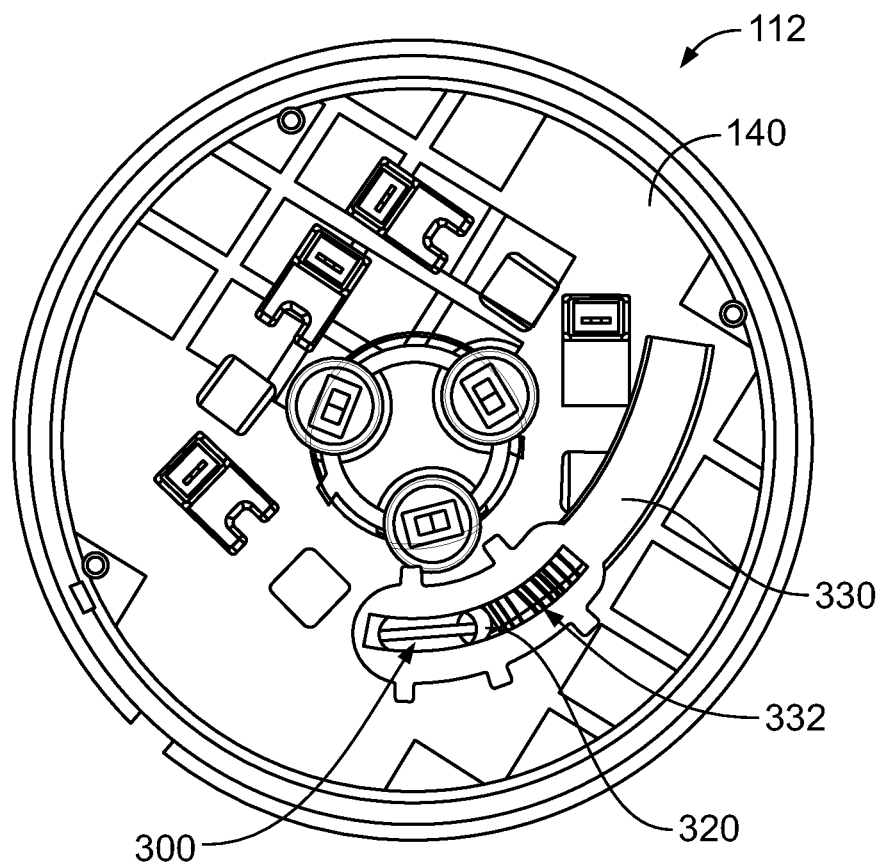
FIG. 11 is a top view of a portion of the plug connector in accordance with an exemplary embodiment.
Figure 12:
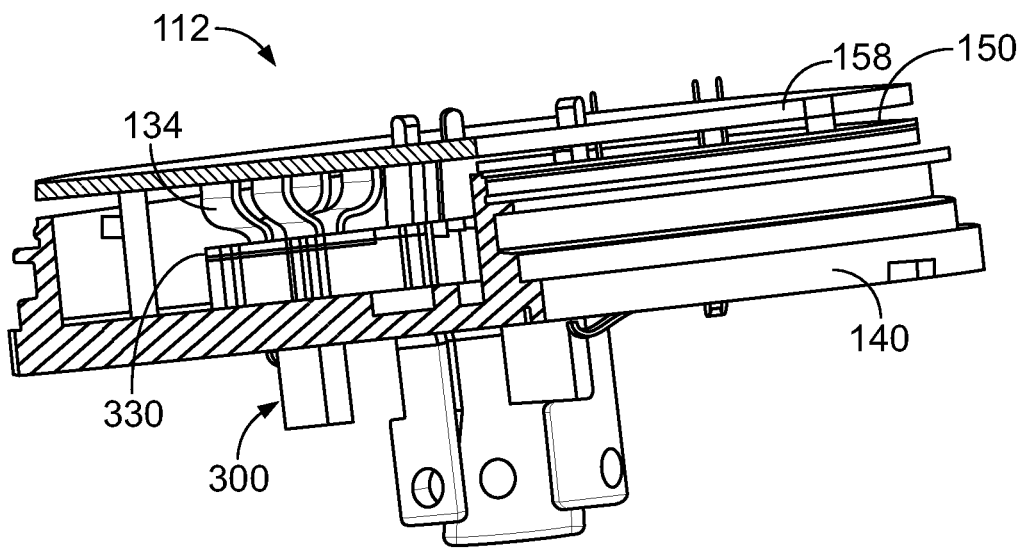
FIG. 12 illustrates the cover coupled to the plug connector housing in accordance with an exemplary embodiment.

FIG. 11 is a top view of a portion of the plug connector 112 in accordance with an exemplary embodiment. FIG. 12 illustrates the cover 330 coupled to the plug connector housing 140. The cover 330 retains the connector holder 320 and the high speed electrical connector 300 in the guide track 352. Optionally, a portion of the high speed electrical connector 300 may extend through the slot 332 in the cover 330.

Figure 13:
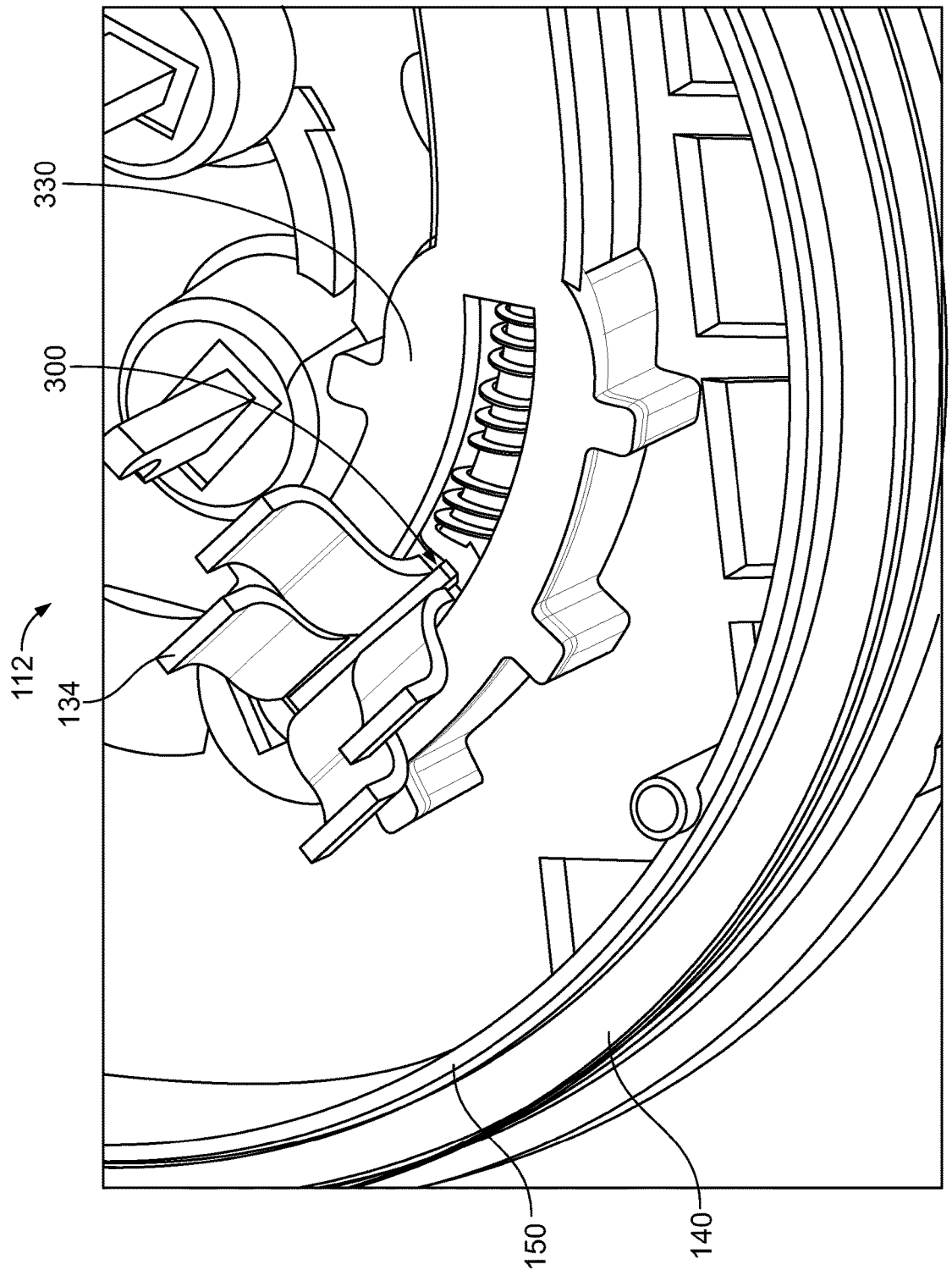
FIG. 13 is a top perspective view of a portion of the plug connector in accordance with an exemplary embodiment.

FIG. 12 is a partial sectional view of a portion of the plug connector 112 in accordance with an exemplary embodiment. FIG. 13 is a top perspective view of a portion of the plug connector 112 in accordance with an exemplary embodiment. FIGS. 12 and 13 illustrate the circuit board 158 coupled to the top 150 of the plug connector housing 140. In an exemplary embodiment, wires or cables 134, which are electrically connected to the high speed electrical connector 300, extend through the cover 330 and are electrically connected to the circuit board 158.

Figure 14:
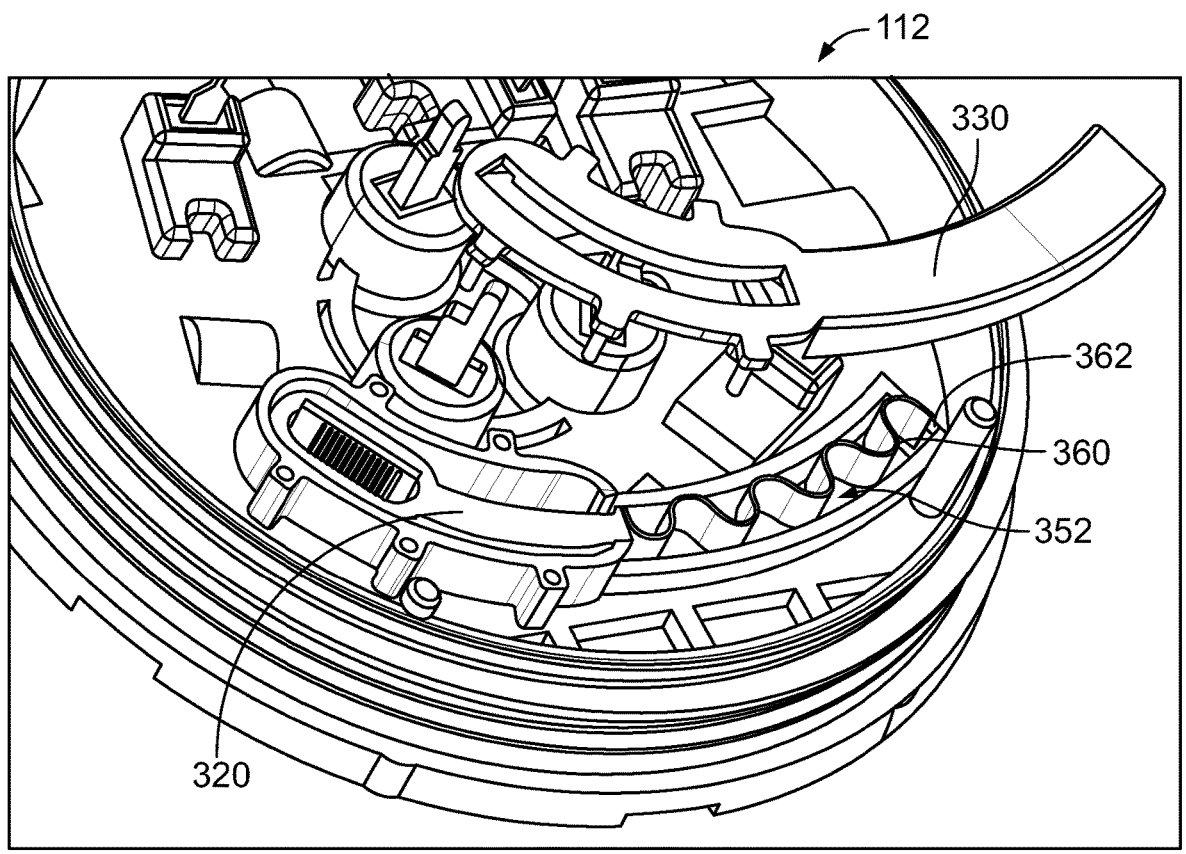
FIG. 14 is a top perspective view of a portion of the plug connector in accordance with an exemplary embodiment.
Figure 15:
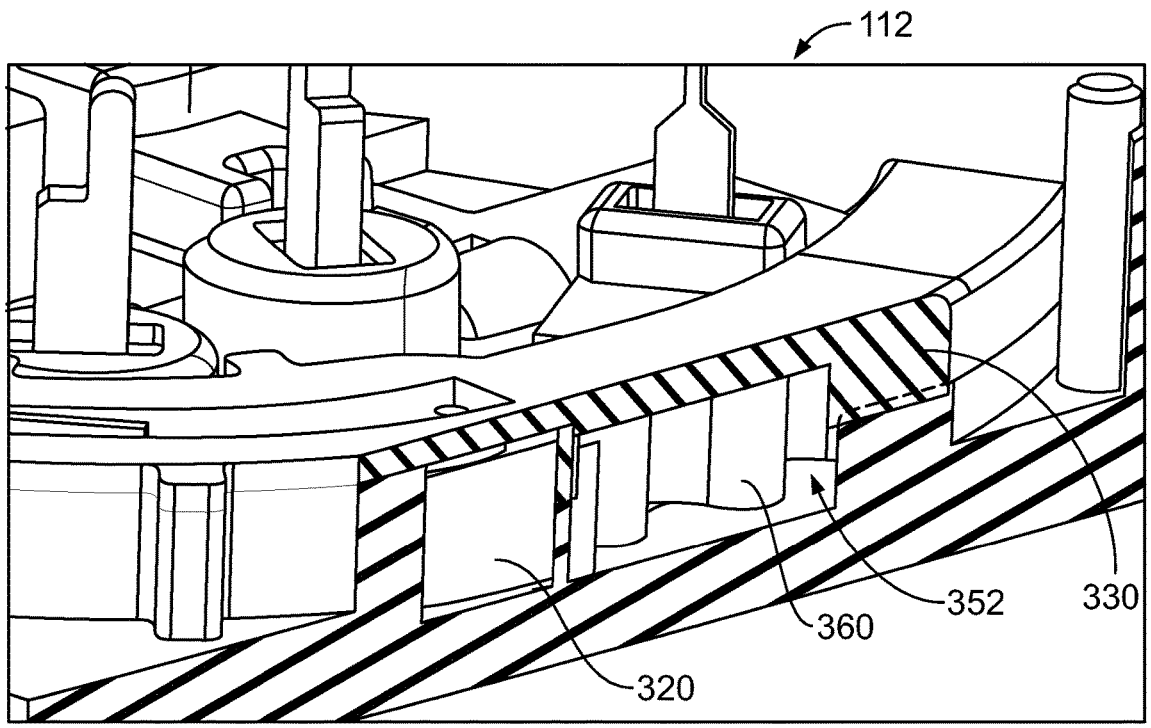
FIG. 15 is a partial sectional view of a portion of the plug connector in accordance with an exemplary embodiment.

FIG. 14 is a top perspective view of a portion of the plug connector 112 in accordance with an exemplary embodiment. FIG. 15 is a partial sectional view of a portion of the plug connector 112 in accordance with an exemplary embodiment. FIGS. 14 and 15 illustrate the biasing member 360 as a ribbon spring rather than a coil spring. The ribbon spring engages the stop wall 362. The ribbon spring is compressible between the stop wall 362 and the connector holder 320 the cover 330 retains the ribbon spring in the guide track 352.

Figure 16:
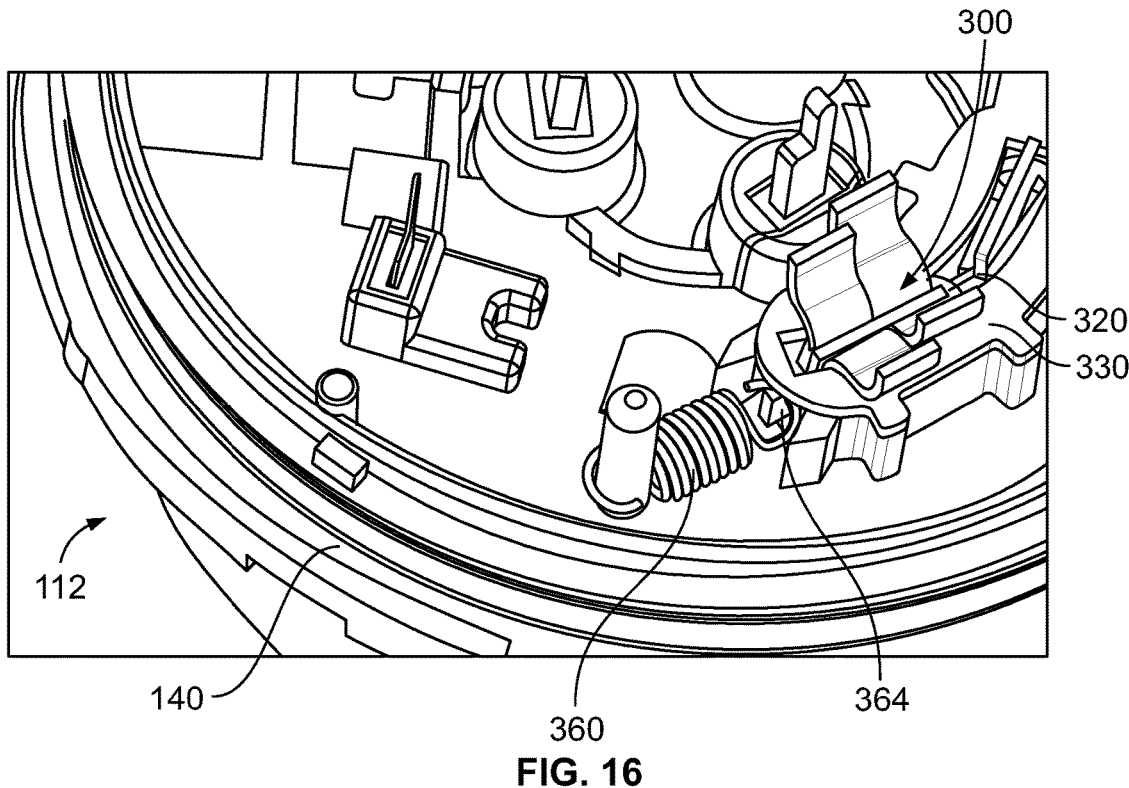
FIG. 16 is a top perspective view of a portion of the plug connector in accordance with an exemplary embodiment.
Figure 17:
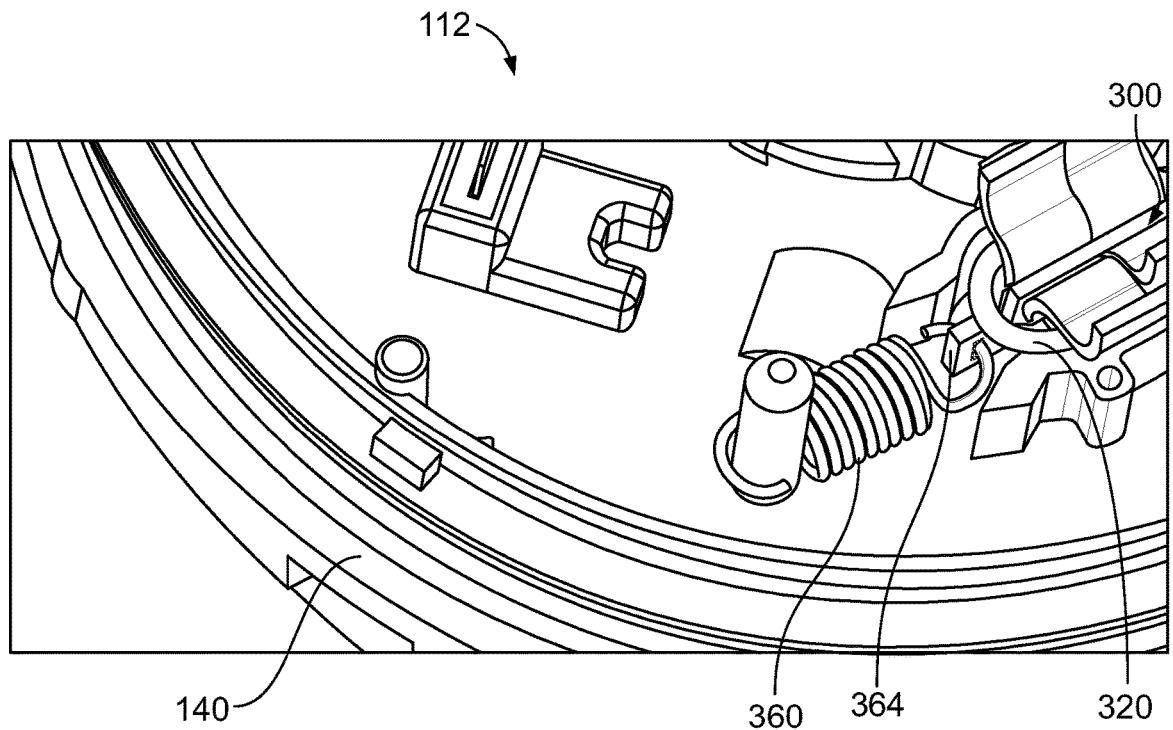
FIG. 17 is a top perspective view of a portion of the plug connector in accordance with an exemplary embodiment.

FIG. 16 is a top perspective view of a portion of the plug connector 112 in accordance with an exemplary embodiment. FIG. 17 is a top perspective view of a portion of the plug connector 112 in accordance with an exemplary embodiment. The cover 330 is removed in FIG. 17 to illustrate the connector holder 320 and the high speed electrical connector 300. FIGS. 16 and 17 illustrate the biasing member 360 as a tension coil spring coupled to a leading end 364 of the connector holder 320. The tension coil springs configured to be stretched when the plug connector housing 140 is rotated creating a pulling force on the connector holder 320 and the high speed electrical connector 300 to return the high speed electrical connector 300 to the home position.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A twist-lock connector system comprising:
a first twist-lock connector including a first connector housing holding first twist-lock contacts at a first rotate-to-mate interface, the first twist-lock connector including a first high speed electrical connector held by the first connector housing, the first high speed electrical connector including first high speed contacts, the first high speed electrical connector movable relative to the first connector housing between a home position and a rotated position, the first twist-lock connector including a biasing member coupled to the first high speed electrical connector to bias the first high speed electrical connector to the home position; and
a second twist-lock connector including a second connector housing holding second twist-lock contacts at a second rotate-to-mate interface, the second twist-lock contacts electrically connected to the first twist-lock contacts to transfer power between the first twist-lock connector and the second twist-lock connector, the second twist-lock connector including a second high speed electrical connector held by the second connector housing, the second high speed electrical connector including second high speed contacts electrically connected to the first high speed contacts to transfer high speed data between the first twist-lock connector and the second twist-lock connector.

2. The twist-lock connector system of claim 1, wherein the second twist-lock contacts are mated with the first twist-lock contacts along a mating axis and the second twist-lock contacts are locked to the first twist-lock contacts by rotating at least one of the first twist-lock connector and the second twist-lock connector in a rotating direction about the mating axis, the second high speed contacts being mated with the first high speed contacts along the mating axis, the first twist-lock connector moving relative to the first connector housing from the home position to the rotated position as the at least one of the first twist-lock connector and the second twist-lock connector are rotated in the rotating direction.

3. The twist-lock connector system of claim 1, wherein the first connector housing includes a guide track receiving the first high speed electrical connector, the guide track guiding relative movement of the first high speed electrical connector relative to the first connector housing.

4. The twist-lock connector system of claim 3, wherein the guide track is curved along an arcuate path.

5. The twist-lock connector system of claim 1, wherein the biasing member is a coil spring.

6. The twist-lock connector system of claim 1, wherein the biasing member pushes the first high speed electrical connector to the home position.

7. The twist-lock connector system of claim 1, wherein the biasing member pulls the first high speed electrical connector to the home position.

8. The twist-lock connector system of claim 1, further comprising a connector holder having a cavity receiving the first high speed electrical connector, the connector holder being coupled to the first connector housing, the connector holder guiding movement of the first high speed electrical connector relative to the first connector housing.

9. The twist-lock connector system of claim 1, wherein the first high speed electrical connector includes a first shield providing electrical shielding for the first high speed contacts, and wherein the second high speed electrical connector includes a second shield providing electrical shielding for the second high speed contacts.

10. A twist-lock connector system comprising:
a plug connector including a plug connector housing and a sensor element held by the plug connector housing for sensing an environmental characteristic exterior of the plug connector, the plug connector including twist-lock plug contacts held by the plug connector housing and extending from a mating interface of the plug connector housing, the plug connector including a first high speed electrical connector held by the plug connector housing, the first high speed electrical connector including first high speed contacts; and
a receptacle connector coupled to the plug connector at a rotate-to-mate interface, the receptacle connector including a receptacle connector housing having contact channels, the receptacle connector including twist-lock receptacle contacts received in corresponding contact channels and configured to receive the twist-lock plug contacts to transfer power between the receptacle connector and the plug connector, the receptacle connector including a second high speed electrical connector held by the receptacle connector housing, the second high speed electrical connector including second high speed contacts mated with corresponding first high speed contacts to transfer high speed data signals between the receptacle connector and the plug connector;
wherein the plug connector is rotated from a first mated position to a second mated position to lock the twist-lock plug contacts and the twist-lock receptacle contacts, wherein one of the first high speed electrical connector or the second high speed electrical connector is fixed relative to the plug connector housing or the receptacle connector housing, respectively as the plug connector is rotated from the first mated position to the second mated position, wherein the other of the first high speed electrical connector or the second high speed electrical connector is movable relative to the plug connector housing or the receptacle connector housing, respectively as the plug connector is rotated from the first mated position to the second mated position from a home position to a rotated position and being spring biased to return to the home position.

11. The twist-lock connector system of claim 10, further comprising a biasing member coupled to the movable one of the first high speed electrical connector or the second high speed electrical connector.

12. The twist-lock connector system of claim 10, further comprising a guide track receiving the movable one of the first high speed electrical connector or the second high speed electrical connector to guide movement between the first high speed electrical connector and the plug connector housing or the second high speed electrical connector and the receptacle connector housing.

13. A light sensor assembly for mounting to a fixture housing of a light fixture, the light sensor assembly comprising:
a plug connector including a plug connector housing and a sensor element held by the plug connector housing for sensing an environmental characteristic exterior of the plug connector, the plug connector housing including a base and a sensor lid extending from the base, the base having a bottom defining a mating interface, the base including a guide track and a slot at a bottom of the guide track open at the bottom of the base, the plug connector including twist-lock plug contacts coupled to the base and extending from the bottom of the base, the plug connector including a first high speed electrical connector held by the plug connector housing in the guide track and extending through the slot from the bottom of the base, the first high speed electrical connector including first high speed contacts, the first high speed electrical connector being movable in the guide track and the slot from a home position to a rotated position, the plug connector including a biasing member coupled to the first high speed electrical connector to bias the first high speed electrical connector to the home position; and a receptacle connector configured to be coupled to the light fixture to control operation of the light fixture, the receptacle connector coupled to the plug connector at a rotate-to-mate interface, the receptacle connector including a receptacle connector housing having contact channels, the receptacle connector including twist-lock receptacle contacts received in corresponding contact channels and configured to receive the twist-lock plug contacts to transfer power between the receptacle connector and the plug connector, the receptacle connector including a second high speed electrical connector held by the receptacle connector housing, the second high speed electrical connector including second high speed contacts mated with corresponding first high speed contacts to transfer high speed data signals between the receptacle connector and the plug connector.

14. The light sensor assembly of claim 13, wherein the plug connector is rotated from a first mated position to a second mated position to lock the twist-lock plug contacts and the twist-lock receptacle contacts, wherein the second high speed electrical connector is fixed relative to the receptacle connector housing as the plug connector is rotated from the first mated position to the second mated position, and wherein the plug connector housing rotates relative to the first high speed electrical connector as the plug connector is rotated from the first mated position to the second mated position.

15. The light sensor assembly of claim 13, wherein the twist-lock receptacle contacts are mated with the twist-lock plug contacts along a mating axis and the twist-lock receptacle contacts are locked to the twist-lock plug contacts by rotating at least one of the first high speed electrical connector and the second high speed electrical connector in a rotating direction about the mating axis, the second high speed contacts being mated with the first high speed contacts along the mating axis, the first high speed electrical connector moving relative to the plug connector housing from the home position to the rotated position as the at least one of the first high speed electrical connector and the second high speed electrical connector are rotated in the rotating direction.

16. The light sensor assembly of claim 13, wherein the guide track is curved along an arcuate path.

17. The light sensor assembly of claim 13, wherein the plug connector includes a connector holder received in the guide track, the connector holder having a cavity receiving the first high speed electrical connector, the connector holder being coupled to the plug connector housing, the connector holder guiding movement of the first high speed electrical connector relative to the plug connector housing.

18. The light sensor assembly of claim 17, wherein the connector holder includes a tail, the biasing mechanism being coupled to the tail.

19. The light sensor assembly of claim 17, further comprising a cover coupled to the plug connector housing over the guide track to hold the connector holder and the first high speed electrical connector in the guide track.

20. A light sensor assembly for mounting to a fixture housing of a light fixture, the light sensor assembly comprising:

a plug connector including a plug connector housing and a sensor element held by the plug connector housing for sensing an environmental characteristic exterior of the plug connector, the plug connector housing including a base and a sensor lid extending from the base, the base having a bottom defining a mating interface, the plug connector including twist-lock plug contacts coupled to the base and extending from the bottom of the base, the plug connector including a first high speed electrical connector held by the plug connector housing, the first high speed electrical connector including first high speed contacts; and a receptacle connector configured to be coupled to the light fixture to control operation of the light fixture, the receptacle connector coupled to the plug connector at a rotate-to-mate interface, the receptacle connector including a receptacle connector housing having contact channels extending from a top of the receptacle connector housing, the receptacle connector including twist-lock receptacle contacts received in corresponding contact channels and configured to receive the twist-lock plug contacts to transfer power between the receptacle connector and the plug connector, the receptacle connector housing including a guide track and a slot at the top of the receptacle connector housing, the receptacle connector including a second high speed electrical connector held by the receptacle connector housing, the second high speed electrical connector including second high speed contacts mated with corresponding first high speed contacts to transfer high speed data signals between the receptacle connector and the plug connector, the second high speed electrical connector being movable in the guide track and the slot from a home position to a rotated position, the plug connector including a biasing member coupled to the second high speed electrical connector to bias the second high speed electrical connector to the home position.

* * * * *